United States Patent [19]
Fronabarger

[11] 3,793,100
[45] Feb. 19, 1974

[54] IGNITER COMPOSITION COMPRISING A PERCHLORATE AND POTASSIUM HEXACYANO COBALTATE III

[75] Inventor: John W. Fronabarger, Phoenix, Ariz.

[73] Assignee: Unidynamics/Phoenix, Inc., Goodyear, Ariz.

[22] Filed: Nov. 24, 1972

[21] Appl. No.: 308,965

[52] U.S. Cl.................. 149/77, 149/86, 149/109
[51] Int. Cl................................................ C06c 1/00
[58] Field of Search....... 149/45, 46, 61, 75, 76, 77, 149/86, 109

[56] References Cited
UNITED STATES PATENTS

| | | | |
|---|---|---|---|
| 97,566 | 12/1869 | Taylor | 149/86 |
| 2,995,429 | 8/1961 | Williams et al. | 149/86 X |
| 2,899,468 | 8/1959 | Cadle | 149/36 X |
| 2,951,335 | 9/1960 | Stengel | 149/36 |
| 86,980 | 2/1869 | Gomez | 149/77 |
| 691,919 | 1/1902 | Stire | 149/86 |
| 3,147,160 | 9/1964 | McCrone | 149/76 |
| 3,523,840 | 8/1970 | Bedell | 149/36 X |
| 3,673,015 | 6/1972 | Sollott et al. | 149/45 X |

OTHER PUBLICATIONS

Greene et al., Chem. Abs., 59, No. 10968d (1963) QD 1 A51

Primary Examiner—Carl D. Quarforth
Assistant Examiner—E. A. Miller
Attorney, Agent, or Firm—Cahill, Sutton & Thomas

[57] ABSTRACT

Energetic and rapid burning compositions suitable for use as a rapid deflagrating material, for ignition of other materials, e.g., hot wire ignition and/or for use in primers and the like, are prepared by dissolving in aqueous solution one or more powerful oxidizer salts such as alkali metal, especially potassium perchlorates, chlorates, chromates, or nitrates, along with a cyano metal complex fuel such as potassium or sodium ferricyanide, ferrocyanide, cobaltocyanide, or closely similar materials, then coprecipitating by pouring the aqueous solution into a water-compatible organic non-solvent liquid such as $C_2$ to $C_4$ monohydric alcohol. Specifically disclosed are compositions of major proportions of potassium perchlorate or dichromate and minor proportions of potassium ferricyanide $K_3Fe(CN)_6$, or the analogous cobaltate $K_3Co(CN)_6$. The reaction product is precipitated from the water solution by dumping it into an excess of 2-propanol. The precipitation procedure produces a much smoother and more homogeneous product than comparable prior art pyrotechnic materials. The products have a burning velocity which is intermediate between those of conventional pyrotechnic ignition materials and detonating materials such as "Primacord" and similar products.

3 Claims, No Drawings

IGNITER COMPOSITION COMPRISING A PERCHLORATE AND POTASSIUM HEXACYANO COBALTATE III

BACKGROUND AND PRIOR ART

Numerous compositions designed for use as explosives, propellants, igniters, elements of pyrotechnics, etc., have been proposed in the past. In many of these, various chlorates and/or perchlorates especially the alkali metal and ammonium salts, have been employed as oxidizers. A variety of combustible materials have been employed as fuels. Thus, in the old 1864 U.S. Patent to Halvorson, No. 43,021, it is suggested that explosives can be created by saturating saw dust with Prussian blue or ferric ferrocyanide, $Fe_4(Fe(CN)_6)_3$ and combining the treated saw dust with an oxidizer, such as potassium chlorate, in combination with potassium nitrate. The saw dust is immersed in a saturated solution of the oxidizer salts and the latter are precipitated with alcohol to leave a doughy mass which can be used as an explosive. In this patent, of course, the saw dust is the main fuel.

In other references, e.g., U.S. Pat. No. 2,941,352, compositions designed for use as rocket propellants are compounded by mixing powerful granular or solid oxidizers such as nitrates or perchlorates into rubbery binders which also serve as fuels. To control or modify the burning rate, iron cyanide complexes such as Prussian blue, Milori blue, etc. may be incorporated into the rubbery binder before the solid oxidizer material is mixed in. The ferrocyanide or analogous material, such as cobaltous salts or chromic, etc., in this case is in finely particulated form and is used in proportions of about one part by weight per seven to 200 parts of oxidant. Here the rubber is the primary fuel.

Still other compositions described in the prior art are concerned with explosive compositions made up of $KClO_3$ plus starch, brick dust and a small amount of potassium ferrocyanide or similar material to affect the reaction rate, as in U.S. Pat. No. 1,028,950; analogous match compositions and ignition materials for self-lighting cigarettes are suggested respectively in U.S. Pat. Nos. 1,406,176 and 2,130,115. As early as U.S. Pat. No. 97,566, explosives for blasting were suggested to be made up of a mixture of potassium ferrocyanide, paraffin and chlorate of potash. Later references, such as U.S. Pat. No. 3,214,308, have suggested still other combinations including perchlorates and ferrocyanides.

In the prior art described, the compositions generally have been made up of a blend of heterogeneous materials, i.e., discrete particles or crystals of the oxidizer salt such as perchlorate, chlorate or nitrate, and separate particles, although often very finely ground, of the ferrocyanide or analogous material. Because of their heterogeneous nature, these products have varied in their performance and not been ideal ignition agents or primers.

By contrast, the compositions of the present invention are homogeneous materials having uniform ignition and burning properties which can be controlled or modified to meet particular requirements. Also, whereas most of the prior art compositions are made up mainly of oxidizer and organic fuel (or in some cases, a high energy combustible metal), in the present case the composition consists essentially of the two salts, coprecipitated from a common solution to produce a highly homogeneous product. That is, the cyano complexes serve as primary fuels.

DESCRIPTION OF PREFERRED EMBODIMENT

The products of the present invention are compositions of high energy which are particularly suitable as ignition materials, especially for use in metal clad deflagrating cord and also for hot wire ignition and/or for use in priming devices. They are energetic and moderately rapid burning but do not detonate. They are safe to handle, being relatively inert to impact.

The oxidizers may be any of the following or combinations or any two or more thereof, in various proportions, as will be understood by those skilled in the art:

a. metal, ammonium and amine perchlorates;
b. metal, ammonium and amine chlorates;
c. metal, ammonium and amine nitrates;
d. metal, ammonium and amine hexanitro-cobaltates (III), cobaltinitrites, e.g., $K_3Co(NO_2)_6 \cdot H_2O$ and equivalent homologs and derivatives of any of these.
e. metal, ammonium or amine dichromates;
f. metal permanganates.

The fuels, on the other hand, may be selected from any one or more of the following materials:

a. metal hexacyanocobaltates III (cobalticyanides), e.g., $K_3Co(CN)_6$;
b. metal hexacyanoferrates III (typically ferricyanides, e.g., $K_3Fe(CN)_6$) or hexacyanoferrates II (ferrocyanides $K_4Fe(CN)_6 \cdot 3H_2O$);
c. metal hexacyanomanganates III; and
d. cyano complexes of nickel and chromium.

These compositions are prepared by dissolving together appropriate proportions of the oxidizers and fuels in a cosolvent and then coprecipitating by pouring the resulting solution into an organic liquid in which the salts are not soluble. Water is a suitable cosolvent for most of the materials listed above and a water-compatible alcohol, in which all the salts are quite insoluble, is preferred for coprecipitation. For the latter purpose, a $C_2$ to $C_4$ alcohol, i.e., ethyl, propyl or butyl alcohol may be used, the propyl alcohols such as 2-propanol being generally preferred because of good water compatibility combined with very low solvency for the salts and fuels. In some cases, low molecular weight ketones may be used in lieu of or in combination with one or more of the alcohols just mentioned.

The coprecipitated products are homogeneous and smooth and uniform, as compared to the conventional mechanically blended compositions commonly made for pyrotechnic purposes. They are referred to hereinafter as reaction products, although in some cases they may be mere mixtures.

The ratios of oxidizer to fuel may be altered within rather wide limits to provide latitude and variation in properties and performance. In general, one to five parts by weight of the oxidizer will be used with two to one parts by weight of the fuel compound. Usually, the oxidizer equals or exceeds the other component in weight, preferable limits being one to three parts of oxidizer to one part of fuel. The ratio of fuel to oxidizer is adjusted to obtain the desired oxidant balance.

The products of this process are useful as priming compositions particularly in the form of metal clad deflagrating cord, but also in electric and fuse type caps and in suitable form for hot wire ignition. They are reliably ignitable but are not unduly sensitive, being generally less susceptible to impact than conventional basic lead styphnate, for example, under similar conditions. Most of them are hot wire sensitive and very rapid burning, as compared to most pyrotechnic compositions, but they are not of detonating velocity.

EXAMPLE 1

A composition was made up by first dissolving 61 parts by weight of potassium perchlorate, $KClO_4$ and 39 parts of potassium ferricyanide, $K_3Fe(CN)_6$, in warm water and then precipitating by pouring the solution into an excess of 2-propanol. The homogeneous precipitate which formed was allowed to dry and thereafter was tested for its ignition properties. It was found to be ignitable by a 1-ohm wire (a length of 0.005 inch of nichrome wire having resistance of 158 ohms per foot) at a current of 1.5 amperes. It was also ignitable from a 100 microfarad capacitor charged at 10 volts through a 5-ohm wire. Using a 1-ohm bridge and a current of 2 amperes or more, the ignition times were slightly slower but still comparable to times for conventional basic lead styphnate (BLS) when used under comparable conditions.

This material also exhibited a no-fire energy from a 1-ohm wire which was greater than that shown by BLS and it was found to be less sensitive to impact, and hence, safer to handle, than BLS.

EXAMPLE 2

A composition was made up in the same manner as in Example 1 but consisted of 61 parts by weight of potassium perchlorate and 39 parts of potassium hexacyanocobaltate (cobalticyanide, $K_3Co(CN)_6$). This was precipitated in propyl alcohol as in Example 1 and allowed to dry before testing.

The product was found to be ignitable from a 1-ohm wire, as above, at 2 amperes. At higher current, 3 amperes or more, the ignition times were slightly slower but comparable to those obtained with basic lead styphnate (BLS), as in Example 1, above. Here again, the composition showed a no-fire energy from a 1-ohm wire which was greater than that obtained from BLS. The composition of Example 2 was found to have a ballistic potential approximately equal to that produced by normal lead styphnate. As in the case of Example 1, this composition was also less sensitive to impact than basic lead styphnate.

The product of Example 1 was formed into a drawn aluminum-sheath cord of 0.093 inch outside diameter, containing 3.7 grams of ignition material per running foot. Samples of this metal sheathed cord 6 inches long were ignited with a 7 milligram cc ignition element to test the burning rate. Seven such samples showed burning rates as indicated below. An eighth sample was ignited with a Hercules D3A2 detonator:

Test No. — Burning rate, in/sec.
1 — 9,380
2 — 9,520
3 — 9,520
4 — 9,230
5 — 9,550
6 — 9,290
7 — 9,650
8 — 9,580

Depending on compaction or density, the burning velocity can be varied from about 4,000 to 1,200 inches per second.

EXAMPLE 3

A composition was made up in the same manner as in Example 1, but consisted of 82 parts by weight of potassium dichromate and 18 parts of potassium ferricyanide. These were dissolved in water and the reaction product precipitated in isopropyl alcohol as in Example 1. The precipitate was allowed to dry before testing.

This product was easily ignitable by flame. However, it burned rapidly but without a flash or report, as compared to the more active materials of Examples 1 and 2. This product appears to have utility in applications where softer ignition characteristics are desirable.

In this particular composition, proportions may be varied between about 60 to 90 parts by weight of the oxidizer salt and 10 to 40 parts of the metal complex fuel salt.

It was found on further tests that the products described above, in Examples 1, 2 and 3, were superior in thermal stability to basic lead styphnate. It appears that many of the products of this invention will have superior thermal stability.

The combination of oxidizer salt and fuel complex, without organic or other fuel constituents, normally is preferred. However, as suggested above, the compositions of this invention can be varied in energy, stability, sensitivity, and in other respects, by varying the ingredients used and the proportions of each, as will be readily understood by those skilled in the art. It will be obvious, also, that various conventional additives and modifiers may be incorporated to further control sensitivity and energy characteristics.

Conventional and available fuel binders may be used. For example, polybutadiene and/or polybutadiene-acrylic acid copolymers, copolymers of polybutadiene and acrylonitrile, polyvinylidene compositions and copolymers such as those of polyvinylidene fluoride and perfluoropropylene, and other and analogous halogenated polymers may be used, singly or in various combinations.

Inert fillers, such as kieselguhr, as well as powdered, particulate or fibrous materials which may have fuel value, such as starches, sugars, cabonaceous fines, such as ground charcoal, coal, gilsonite, etc., may be added to dilute or to increase energy, etc. as will be understood by those skilled in the art. Moisture absorbents or dessicants of various types may be used to offset high atmospheric humidity in appropriate cases, as also will be self-evident to those familiar with the art.

It is intended by the foregoing and by the claims which follow, to cover the various modifications and variations described above and others which will suggest themselves to those skilled in the art, as far as the state of the prior art properly permits.

What is claimed is:

1. An energetic and rapid burning composition comprising one to five parts by weight of an oxidizer salt selected from the group which consists of alkali metal and ammonium perchlorates and two to one parts by weight of potassium hexacyano cobaltate III.

2. A composition according to claim 1 in which the weight ratios are between one and three parts of oxidizer salt to one part of fuel.

3. A composition according to claim 1 in which the oxidizer salt is potassium perchlorate and the fuel is potassium hexacyanocobaltate.

* * * * *